United States Patent
Lacer, Jr. et al.

[15] 3,704,505
[45] Dec. 5, 1972

[54] O-RING INSERTION TOOL

[72] Inventors: Wilford G. Lacer, Jr., 4013 W. Maricopa, Phoenix, Ariz. 85009; Leland E. Mathews, 4422 W. Crittenden Lane, Phoenix, Ariz. 85031

[22] Filed: May 10, 1971

[21] Appl. No.: 141,555

[52] U.S. Cl. ................................................29/235
[51] Int. Cl. ................................................B23p 19/00
[58] Field of Search ..................29/235, 451, 280–283

[56] References Cited

UNITED STATES PATENTS

| | | |
|---|---|---|
| 3,180,015 | 4/1965 | Thompson et al......................29/235 |
| 3,289,286 | 12/1966 | Belanger ................................29/235 |
| 3,406,441 | 10/1968 | Larsson ...............................29/235 X |
| 3,553,817 | 1/1971 | Lallak ....................................29/235 |

*Primary Examiner*—Othell M. Simpson
*Attorney*—C. Robert von Hellens

[57] ABSTRACT

A tool which provides for facile and rapid insertion of O-ring sealing members within rectilinear bushing seals.

10 Claims, 3 Drawing Figures

PATENTED DEC 5 1972 3,704,505

INVENTOR.
WILFORD G. LACER, JR
LELAND E. MATHEWS
BY
Robert von Ahlers
ATTORNEY

O-RING INSERTION TOOL

BACKGROUND OF THE INVENTION

1. Field of the Invention

The invention relates to apparatus for inserting annular elastic members into internally annularly grooved cylindrical members.

2. Description of the Prior Art

Various mechanical devices have shafts enclosed within housings, where the housing serves as a bushing and includes an internal oil seal. The oil seal, comprising an O-ring positioned and retained by an annular groove in the inside face of the housing, extends inwardly from the housing to contact the shaft. During dissassembly and assembly of the shaft/housing unit the O-ring must usually be replaced. To effect its removal variously formed tools have been used to dislodge and extract the O-ring. On replacement of the O-ring, extensive manual manipulation with various tools is required as the diameter of the O-ring is greater than the inside diameter of the housing which requires that the O-ring be distorted. The distortion of the O-ring further complicates the insertion process as the imposed internal forces within the O-ring may prevent it from properly expanding into and seating within its annular groove.

SUMMARY OF THE INVENTION

The invention teaches a device useful in inserting seals such as O-rings in annular grooves disposed within circular housings. The device comprises a rod having a retainer member proximate one end of the rod and a grooved portion diametrically opposite to and at a distance from the retainer, whereby the O-ring may be stretched between and held by the retainer and the grooved portion.

A sleeve fitted about the rod co-operates with the rod such that as the sleeve is forced toward the end of the rod, the O-ring disengages from the groove and is forcibly slid along the rod beyond the retainer member and to the extremity of the rod. In operation, the rod end is adjacent the annular groove and on release from the rod, the O-ring will expand and seat itself within the annular groove.

A primary object of the invention is to provide a simple tool for rapidly seating O-rings within rectilinear bushings.

Another object of the invention is to provide a means for inserting O-rings which will not damage the O-ring.

Another object of the invention is to provide a tool for inserting O-rings which requires a minimum amount of skill by the user.

Another object of the invention is to provide a spring loaded tool for inserting O-rings.

DETAILED DESCRIPTION OF THE PREFERRED EMBODIMENT

Mechanical apparatus having a portion including an elongated housing through which a shaft projects often required that one end of the shaft be in a lubricating medium while the other end is in another medium. Such an arrangement necessarily requires a seal between the housing and the shaft to contain the lubricating medium. A standard means for accomplishing such a seal is an O-ring of elastic rubber or plastic-like material seated within an annular groove in the housing and in a contacting relationship with the shaft.

As a result of a mechanical breakdown or during periodic maintenance, the shaft and its housing may have to be disassembled. Prudent practice indicates that prior to assembly the O-ring should be replaced. Once the shaft is removed any of variously formed prong-like devices may be inserted into the housing to pry the O-ring from its seat. On reassembly, the O-ring insertion process presents a substantial problem as the diameter of the O-ring is greater than that of the housing. Thus, it must be distorted during insertion. Once the O-ring has been forced into the housing in proximity to the groove it is not unusual for the O-ring to slide past the annular groove due to its distorted configuration and internal strains imposed thereby which prevent it from expanding into the groove. Additionally, during the process of forcing the O-ring into the annular groove, the implements used may cut or mar the soft material and ruin its effectiveness as a seal. The invention as shown in FIG. 1 provides a means for solving this problem of inserting O-rings.

Figure 1:
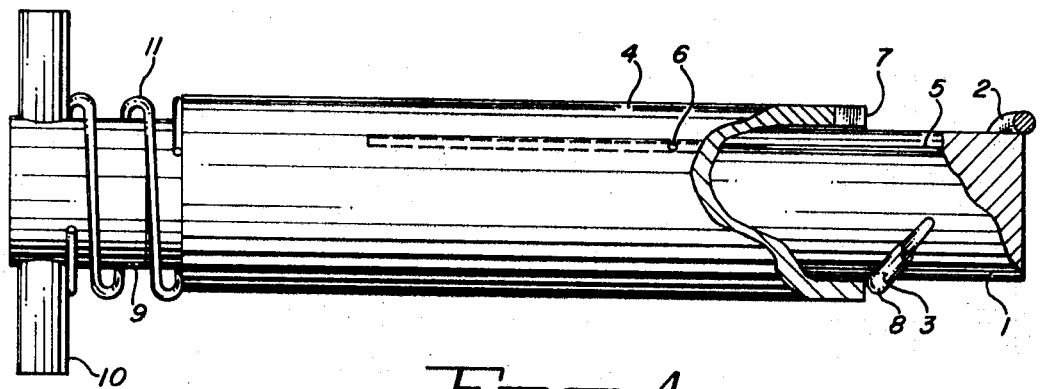
FIG. 1 illustrates a side view of the tool.
Figure 2:
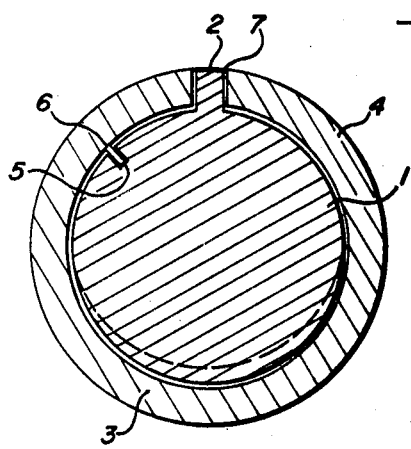
FIG. 2 illustrates a frontal view of the tool.

Referring to FIGS. 1 and 2 there is shown a base member 1 which may be a solid cylindrical piece, having a retainer member extending beyond the surface of the base member 1. Diametrically opposed to and longitudinally displaced from the retainer member 2, there is a groove 3. The depth of the groove 3 is greatest at the point diametrically opposite the retainer member 2 and becomes progressively less as the groove 3 extends up the sides of the base member 1 and toward the retainer member 2. At approximately the half way point between the deepest part of the groove 3 and position of the retainer member 2, the groove 3 blends with the surface of the base member 1. In further explanation of the nature of the configuration of the groove; if the base member 1 were a solid cylinder and a crossection were taken in the plane of groove 3, the groove 3 would describe a parabola.

A sleeve 4 is fitted about the base member 1 such that it is free to slide therealong. A channel 5 disposed in the base member 1 co-operates with a key 6 extending from the sleeve 4 which permits the sleeve 4 to slide in the longitudinal direction but does not permit the sleeve 4 to rotate. A slot 7 in the sleeve 4 is designed to receive the retainer member 2 such that the sleeve 4 may slide toward the retainer member 2 until it is flush with the end of the base member 1.

The longitudinal location of the groove 3 is a function of the diameter of the O-ring 8. The distance between the deepest part of the groove 3 and the retainer member 2 should be approximately equal to or somewhat greater than half the mean circumference of the O-ring 8. In loading the tool, an O-ring 8, which is to be fitted within a rectilinear bushing, is hooked on retainer member 2 and somewhat stretched to fit into the groove 3. Due to the thickness of the base member 1, the O-ring 8 will be in tension, which may be slight but sufficient to maintain it mounted on the base member 1. The actual depth of the groove 3 is a function of both the elasticity and diameter of the O-ring 8, but in general may be approximately equal to slightly less than the radius of the crossection of the O-ring 8. If the retainer member surface which faces away from the grooved portion is slightly inwardly curved, the O-ring 8 is more securely restrained from slipping off the retainer member 2. The sleeve 4, when moved from the position shown in FIG. 1 toward the end of the base member 1 containing the retainer member 2, will force the O-ring 8 out of the groove 3 and push it beyond the end of the base member 1. The operation is further enhanced if the inside diameter of the sleeve 4 is only somewhat larger than the crossectional distance of the base member 1 to minimize slop and yet permit free operation.

In the configuration described above, the O-ring release operation requires the use of two hands; one to hold the base member 1, while the other pushes the sleeve 4 along the base member 1. A modification to permit one handed operation of the invention may be accomplished in the following manner. The base member 1 may be extended by attaching extension 9 to it and including a handle 10 attached normally thereto. A coil spring 11 is disposed between the handle 10 and sleeve 4 to impart a force tending to force the sleeve 4 away from the handle 10. In operation, the handle 10 would be placed in the palm of one's hand, the sleeve 4 brought toward the handle 10, compressing the spring 11. The sleeve 4 could then be gripped by one's forefinger and thumb and the tool would be cocked. The O-ring 8 may now be mounted on base member 1, and released at will by simply releasing one's grip on the sleeve 4. On release, the compressed spring 11 would force the sleeve 4 toward the extremity of the base member 1 and dislodge the O-ring 8.

Figure 3:
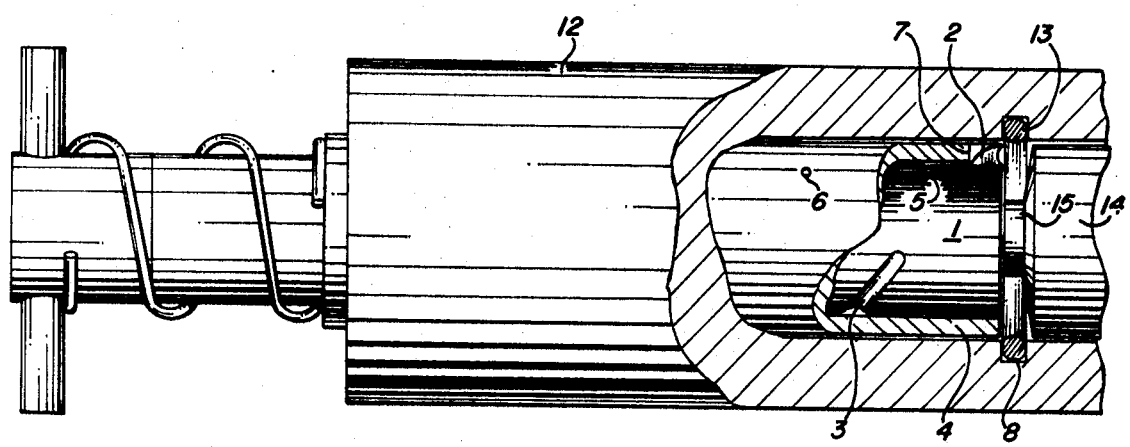
FIG. 3 illustrates a crossection of the tool within a rectilinear bushing seal.

Referring to FIG. 3, the insertion of an O-ring within an internal groove may be more readily explained. FIG. 3 illustrates a crossection of the seal portion of a rectilinear bushing seal 12 having an internal annular groove 13. The loaded tool is inserted into the rectilinear bushing seal 12 and aligned with the annular groove 13 such that the extremity of the base member 1 is aligned with the edge of the groove 13 as shown. If desired, the tool may be calibrated visually or mechanically for particular bushings to secure alignment. Alternatively, an alignment tool, such as shaft 14 may be inserted from the other end of the rectilinear bushing seal 12 to properly position the base member 1. On alignment, the sleeve 4 is forced, manually or automatically, toward the extremity of the base member 1, dislodging the O-ring 8. Continued movement of the sleeve 4 will force the O-ring 8 off of the base member 1 and it will be free to expand and seat itself within the annular cavity 13. If the shaft 14 has a small diameter end piece 15, the O-ring 8 will have additional space within which it may relieve any stresses imposed on it and thereby more easily seat itself.

The O-ring release operation may be accomplished in yet another manner and still permit a one handed operation. If the sleeve 4 is extended beyond the base member 1 a coil spring may be inserted therein and attached to the end thereof. By careful selection of size, elasticity and length, the coil spring can be made to exert a force on the base member 1 tending to eject the base member 1 from within the sleeve 4. If the previously described key and channel arrangement were replaced by a slot in the sleeve 4 coacting with a pin extending from the base member 1, the longitudinal travel of the base member 1 may be limited and it will also prevent rotation between the sleeve 4 and the base member 1. The position and length of the slot/pin arrangement should be such that the coil spring will eject the base member 1 from the sleeve 4 sufficiently to uncover the groove 3 at one extreme and yet permit the base member 1 to be fully contained within the sleeve 4 at the other extreme. In operation, the tool would be loaded while the coil spring is in its extended state causing the base member 1 to protrude from the sleeve 4. The loaded tool is then inserted into the rectilinear bushing seal 12 until the base member contacts the positioning shaft 14. On contact, further pressure is exerted on the sleeve 4 causing the coil spring to compress and the sleeve 4 will slide toward the extended end of the base member 1. Simultaneously, the sleeve 4 will coact with the O-ring 8 fitted on the extended portion of the base member 1 and cause it to seat within the annular groove 13 as desired.

In the preferred embodiment, at least the portion of sleeve 4 contacting the O-ring should have a thickness comparable to that of the O-ring 8 in order to provide only a longitudinal force acting on the O-ring 8. If the sleeve thickness is less than that of the O-ring, the O-ring 8 may be pinched or squeezed against either the base member 1 or the bushing 12 and jam the tool. The O-ring 8 might also be marred or permanently distorted, reducing its effectiveness as a seal. The retainer member 2 should be of a height less than or equivalent to the thickness of the portion of sleeve 4 contacting O-ring 8 so as to prevent it from scratching or marring the bushing during the insertion of the tool.

The sleeve 4 may be modified as follows without detracting from the nature of the invention. The sleeve 4 may be machined or otherwise worked to remove a portion of its thickness other than that portion cooperating with the O-ring. Thereby, additional maneuverability of the tool is available when inserting or extricating the tool. As machining is relatively expensive, the above object may be accomplished more cheaply by using a relatively thinner sleeve 4 and attaching an annular member at its end to provide the requisite thickness.

While the invention has been described in its preferred embodiment, it is to be understood that the words which have been used are words of description rather than limitation and that changes and variations may be made without departing from the proper scope or fair meaning of the subjoined claims.

We claim:

1. Apparatus for inserting an annular expandable sealing member into a bushing having an internal annular groove comprising a base member, a retainer member extending laterally from said base member, a grooved portion in said base member at a point longitudinally disposed from and diametrically opposite to said retainer member, said grooved portion and said retainer member cooperating to engage the sealing member, and a sleeve slideably co-operating with said base member, whereby the sliding action of said sleeve when effected after insertion of the apparatus in the bushing causes the sealing member to disengage from said grooved portion and said retainer member and engage the annular groove.

2. The apparatus as claimed in claim 1 comprising
a longitudinal channel disposed in said base member, means extending inwardly from said sleeve for engaging said channel, whereby rotation of said sleeve about said base member is inhibited.

3. The apparatus as claimed in claim 1 wherein said base member is cylindrical.

4. The apparatus as claimed in claim 1 wherein the thickness of the portion of said sleeve cooperating with the sealing member is at least equal to the crossectional diameter of said sealing member.

5. The apparatus as claimed in claim 1 wherein the distance from the bottom of said grooved portion to the side of said retainer member facing away from said grooved portion is at least equal to half of the mean circumference of the sealing member.

6. The apparatus as claimed in claim 5 wherein said grooved portion extends for a limited distance about either side of said base member toward said retainer member from a point diametrically opposite to said retainer member.

7. The apparatus as claimed in claim 6 wherein the depth of said grooved portion at the point diametrically opposite to said retainer member is less than the radius of the crossection of the sealing member.

8. The apparatus as claimed in claim 1 wherein said retainer member comprises
an inwardly curved side for engaging the sealing member, and
the extremities of said curved side of said retainer member define a plane approximately normal to the longitudinal axis of said base member and are approximately in the plane defined by one end of said base member.

9. The apparatus as claimed in claim 1 including means for gripping said base member, and
means operably associated with said gripping means for exerting a force on said sleeve forcing said sleeve away from said gripping means, whereby said sleeve, in response to said exerting means, will disengage said sealing member from said base member.

10. The apparatus as claimed in claim 9 wherein said exerting means comprises a coil spring attached to one end to said gripping means.

* * * * *